United States Patent
Hirata et al.

(10) Patent No.: US 9,122,139 B2
(45) Date of Patent: Sep. 1, 2015

(54) PROJECTION IMAGE DISPLAYING DEVICE WITH OPENINGS AROUND ITS PROJECTION LENS AND MIRROR

(75) Inventors: Koji Hirata, Yokohama (JP); Masayuki Fukui, Yokohama (JP); Chohei Ono, Kawasaki (JP); Hideharu Saito, Yokohama (JP); Takeshi Katayama, Yokohama (JP)

(73) Assignee: Hitachi Maxell, Ltd., Ibaraki-shi (JP)

(*) Notice: Subject to any disclaimer, the term of this patent is extended or adjusted under 35 U.S.C. 154(b) by 287 days.

(21) Appl. No.: 13/819,988

(22) PCT Filed: Sep. 29, 2010

(86) PCT No.: PCT/JP2010/066976
§ 371 (c)(1),
(2), (4) Date: May 15, 2013

(87) PCT Pub. No.: WO2012/042613
PCT Pub. Date: Apr. 5, 2012

(65) Prior Publication Data
US 2013/0235355 A1    Sep. 12, 2013

(51) Int. Cl.
G03B 21/16    (2006.01)
G03B 21/28    (2006.01)
G02B 21/28    (2006.01)

(52) U.S. Cl.
CPC ............... *G03B 21/16* (2013.01); *G02B 21/28* (2013.01); *G03B 21/28* (2013.01)

(58) Field of Classification Search
CPC ......... G03B 21/28; G03B 21/16; G02B 21/28

USPC ................................................ 353/58, 60, 61
See application file for complete search history.

(56) References Cited

U.S. PATENT DOCUMENTS

2009/0040470 A1* 2/2009 Fukui et al. ............... 353/58

FOREIGN PATENT DOCUMENTS

| JP | 2005-141065 A | 6/2005 |
| JP | 2006-003541 A | 1/2006 |
| JP | 2009-042444 A | 2/2009 |
| JP | 2010-113111 A | 5/2010 |

OTHER PUBLICATIONS

International Search Report on application PCT/JP2010/066976 mailed Nov. 16, 2010; 1 page.

* cited by examiner

*Primary Examiner* — Toan Ton
*Assistant Examiner* — Magda Cruz
(74) *Attorney, Agent, or Firm* — Foley & Lardner LLP

(57) ABSTRACT

In a projection image displaying device which projects imaging light emitted from a projection lens by being reflected by a projection mirror, an air inlet for sucking external air is provided at the position of a sealing mechanism of the projection mirror. Air blown off through openings provided around the projection lens is sucked into a case through this air inlet. When a cooling operation of cooling components within the case is to be performed by sealing the projection mirror, a sucking operation through the air inlet is stopped. This prevents dust in the external air from adhering to a reflective surface of the projection mirror regardless of the installation state of the projection image displaying device.

4 Claims, 10 Drawing Sheets (a) FLOOR INSTALLATION (b) SUSPENDED INSTALLATION (a) FLOOR INSTALLATION (PRIOR ART)

(b) SUSPENDED INSTALLATION (PRIOR ART)

(a)

(b)

(a)

(b)

(c)

(a)

(b)

PROJECTION IMAGE DISPLAYING DEVICE WITH OPENINGS AROUND ITS PROJECTION LENS AND MIRROR

TECHNICAL FIELD

The present invention relates to a projection image displaying device.

BACKGROUND ART

In a projection image displaying device such as a liquid crystal projector or the like, a short projection displaying device in which a projection mirror (a reflection mirror) for folding an optical path is provided between a projection lens and a projecting plane (such as a screen or the like) to reduce the distance between it and the projecting plane is marketed. In addition, in installation modes of the projection image displaying device, various installation modes are possible depending on the application such as not only floor installation that it is installed on a desk or the like, but also suspended installation that it is suspended from a ceiling, upward projection installation that projection is performed toward a ceiling or the like, downward projection installation that projection is performed toward a desk or the like and others.

In these projection image displaying devices, light generated from a light source such as a mercury lamp or the like is radiated to an image display device such as a liquid crystal panel or the like, and imaging light from the display device is enlarged and projected onto a screen via a projection lens. Since the light source such as the mercury lamp or the like is used in a sealed state, its temperature becomes high, and the display device is heated by being irradiated with light from the light source and its temperature rises. Since excessive temperature rise reduces the life of the light source and causes deformation of the display device and image deterioration, cooling air is sent from a cooling fan to the light source and the display device to suppress temperature rise. The cooling air used for this, external air on the outside of device is made to be introduced through an air inlet by a suction fan, to be blown against the light source and the display device and thereafter to be discharged to the outside of device through an exhaust port.

In order to effectively cool the light source and the display device, the wind velocity of the cooling air and the structure of a flow path become important. For example, in a projector device described in Patent Document 1, there is disclosed a configuration for maintaining a light source lamp at an appropriate temperature in various installation states of the device, that is, in the floor installation and the suspended installation, and in addition even when it is used in the upward projection installation and the downward projection installation. In this configuration, an attitude sensor for sensing an installed attitude of the projector device, and a control unit for controlling a fan in accordance with the attitude that the attitude sensor has sensed are provided.

PRIOR ART DOCUMENT

Patent Document

Patent Document 1: Japanese Patent Application Laid-Open No. 2009-42444

SUMMARY OF THE INVENTION

Problem to be Solved by the Invention

When dirt and rubbish and fine dust (hereinafter, referred to as dust and the like) contained in the cooling air adhere to the display device, the amount of light that penetrates the display device is reduced, and the luminance of an image projected onto a screen or the like is reduced and luminance unevenness occurs. Thus, a dust filter for preventing intrusion of the dust and the like is attached to an air inlet for taking in the cooling air from external air. In addition, the air pressure within the device is put into a state (a positive pressure state) which is higher in air pressure than the outside of device with air which has been taken in by a suction fan so as to prevent the external air from entering it such that the durst and the like do not intrude through a case gap other than the air inlet. That is, the structure is such that air within the device is blown off to the outside through the case gap. For example, a gap (an opening) through which movement adjustment of a projection lens is possible in an optical axis direction is present between the projection lens and the case and part of the air within the device will be blown off to the outside through this opening.

The inventor of the present application has found a phenomenon that fine dust adheres to the projection mirror when a projection image displaying device with projection mirror was being used in a suspended installation state. As a result, the luminance of the projected image was reduced and the luminance unevenness occurred as in the case of adhesion of the dust to the display device. Incidentally, when the displaying device is used in a floor installation state, the dust does not adhere to the projection mirror. As a result of analysis, it is assumed that because the air blown off through the opening around the above-mentioned projection lens is mixed with the external air and stays on the mirror surface in the suspended state, the dust contained in the external air adhered to the mirror surface with generated static electricity. In such a case, not only work of removing the dust which has adhered to the mirror surface becomes necessary in order to recover the luminance of the projected image, but also work of cleaning the mirror surface becomes difficult when the displaying device is installed in the suspended state.

An object of the present invention is to prevent the dust within the external air from adhering to a reflective surface of the projection mirror regardless of the installation state of the projection image displaying device.

Means for Solving the Problems

The present invention is characterized in that in a projection image displaying device having a sealable projection mirror on an upper surface of a case and enlarging and projecting imaging light emitted from a projection lens onto a projecting plane by being reflected by the projection mirror, it comprises: a plurality of cooling fans taking in and exhausting external air in order to cool components contained within the case, and an air inlet for sucking the external air into the case is disposed at the position of a sealing mechanism for operating said projection mirror to be sealed/unsealed.

An opening is provided around the projection lens for movement adjustment of the projection lens, and the air inlet provided on the projection mirror sucks air blown off through the opening provided on the projection lens into the case.

When a cooling operation of cooling the components within the case is to be performed by sealing the projection mirror, a sucking operation through the air inlet provided on the projection mirror is stopped or reduced.

Effect of the Invention

According to the present invention, deterioration of the luminance of the projected image caused by the dust adhering to the reflective surface of the projection mirror is eliminated

MODES FOR CARRYING OUT THE INVENTION

Hereinafter, preferred embodiments of the present invention will be described using the drawings.

Embodiment 1

Figure 1:
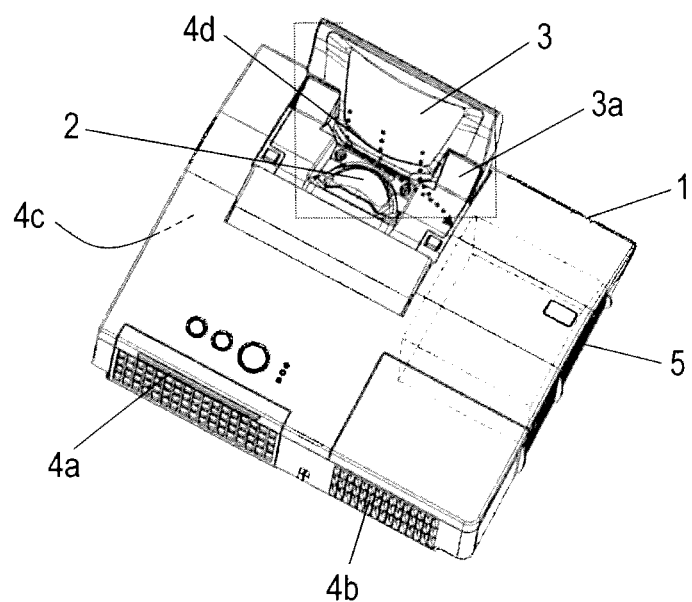
FIG. 1 is an outline view showing one embodiment of a projection image displaying device.
Figure 2:
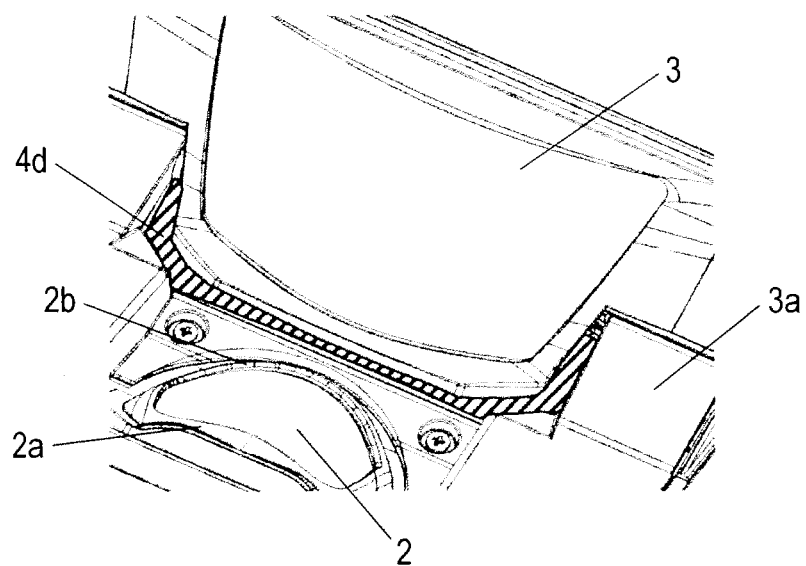
FIG. 2 is an enlarged diagram of the vicinity of a projection mirror of the projection image displaying device in FIG. 1.

FIG. 1 is an outline view showing one embodiment of a projection image displaying device. FIG. 2 is an enlarged diagram of the vicinity of a projection mirror of the projection image displaying device in FIG. 1.

The configuration of the projection image displaying device is such that it has a sealable projection mirror 3 on an upper surface of a case 1, and imaging light emitted from a projection lens 2 is enlarged and projected onto a projecting plane such as a screen or the like by being reflected by a projection mirror 3. Although optical components such as a light source, a display device (a liquid crystal panel) and others are contained within the inside of the case 1, external air is taken in through air inlets 4a to 4d by a cooling fan and air after cooling is discharged through an exhaust port 5 in order to cool heat generated components. While the air inlets 4a and 4b are provided on the front surface side of the case and the air inlet 4c is provided on the rear surface side of the case, the new air inlet 4d is also provided at the position of a sealing mechanism 3a for operating the projection mirror 3 to be sealed/unsealed. Although the shape of the air inlet 4d is shown by hatching, it is formed across a lower end part of the projection mirror 3. The exhaust port 5 exhausts the air after cooling from a side surface on the side opposite to the case to the outside. Openings 2a and 2b are formed around the projection lens 2 in order to enable movement adjustment of the projection lens 2.

Figure 3:
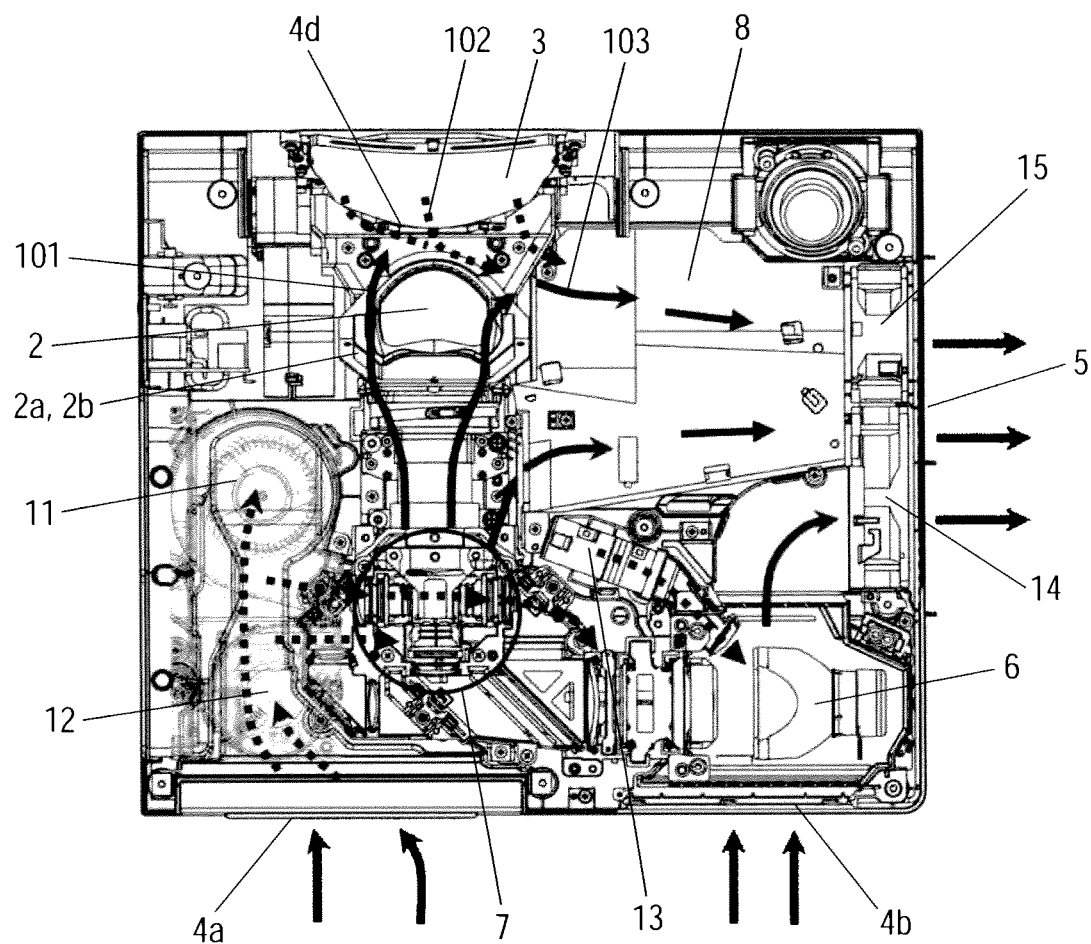
FIG. 3 is a diagram showing an internal configuration of the projection image displaying device in FIG. 1 and flows of cooling air therein.

FIG. 3 is a diagram showing an internal configuration of the projection image displaying device in FIG. 1 and flows of cooling air therein. Within the device, a light source 6 such as a mercury lamp or the like, a liquid crystal panel 7 (a part which is enclosed with a circle) as an image display device, the projection lens 2, the projection mirror 3, and a power source unit 8 are contained as main components. In addition, cooling air is sent to the respective components contained therein by cooling fans 11 to 15. Main flow paths of the cooling air are shown by arrows. The structure is such that the cooling fans 11 and 12 send the cooling air to the liquid crystal panel 7, the cooling fans 13 and 14 send it to the light source 6, and the cooling fan 15 exhausts the air which has cooled the power source unit 8 to the outside of device.

In the flow paths of the cooling air, an air flow 101 shows that part of the air which has cooled the liquid crystal panel 7 moves along the projection lens 2 and is blown off to the outside of device through the openings 2a and 2b. This is because the inside of device in the vicinity of the projection lens 2 is in a positive pressure state (a state which is higher in air pressure than the external air) by an action of sending air from the cooling fans 11 and 12. In addition, an air flow 102 shows that the external air is sucked through the air inlet 4d provided around the projection mirror 3. This is because the inside of device in the vicinity of the projection mirror 3 is in a negative pressure state (a state which is lower in air pressure than the external air) by an exhausting action of the cooling fan 15. An air flow 103 shows that the air sucked through the air inlet 4d cools the power source unit 8. Thereafter, it is exhausted to the outside of device through the exhaust port 5 by the cooling fan 15. Here, since the openings 2a and 2b and the air inlet 4d are arranged adjacent to one another, the air flow 101 which has been blown off to the outside of device through the openings 2a and 2b is sucked in as the air flow 102 through the air inlet 4d. Therefore, it never occurs that the air flow 101 stays in front of the projection mirror 3.

Figure 4:
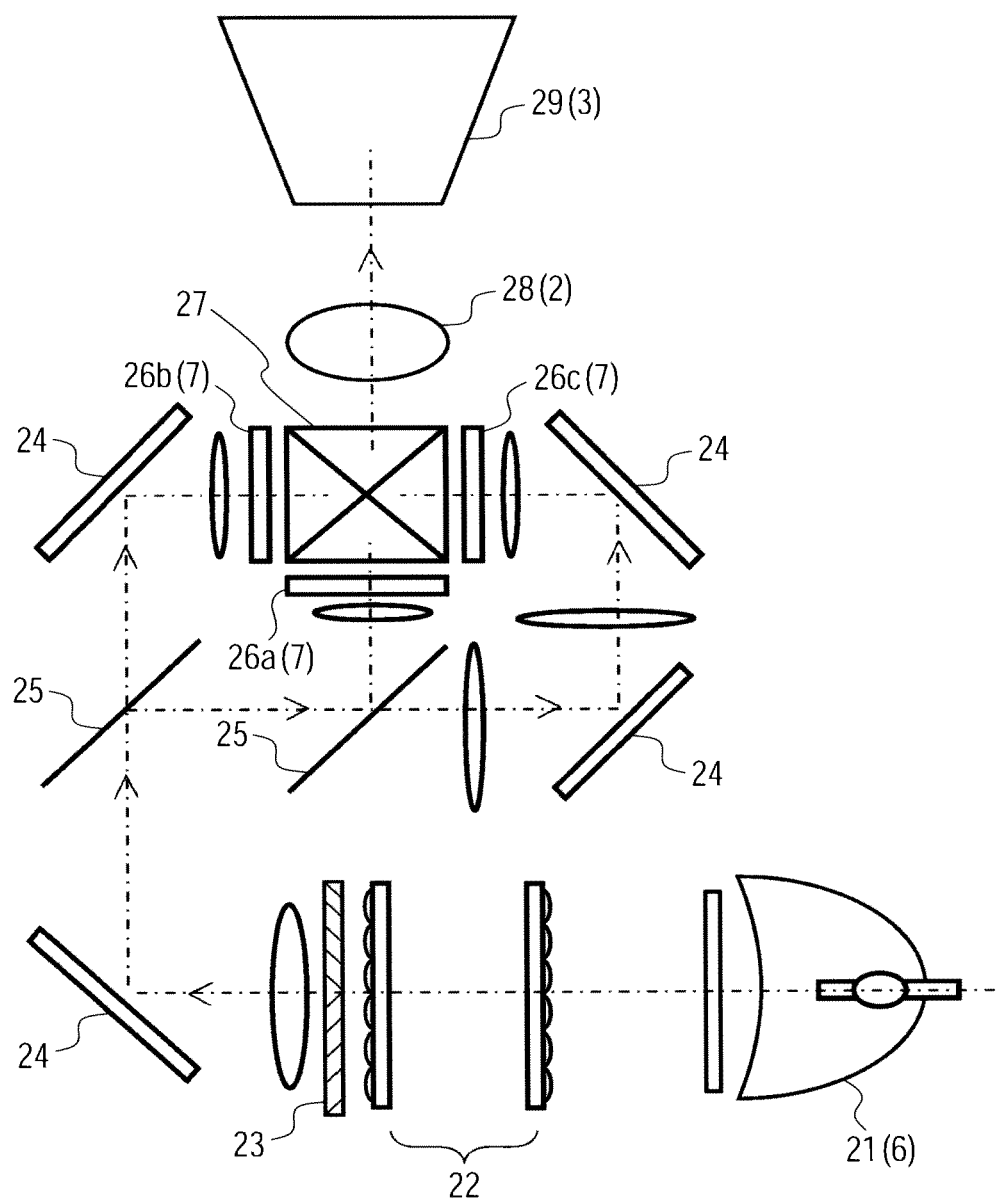
FIG. 4 is a configuration diagram of an optical system of the projection image displaying device in FIG. 1.

FIG. 4 is a configuration diagram of an optical system of the projection image displaying device in FIG. 1. A light source 21 (6) is constituted of a mercury lamp and a reflector. Light emitted from the light source 21 passes through an integrator 22, a polarization conversion device 23 and a reflecting mirror 24, is split by a dichroic mirror 25 into R, G and B lights and radiates liquid crystal panels 26a, 26b and 26c (7). The liquid crystal panels 26a, 26b and 26c form optical images of R, G and B image signals and respective imaging lights which have penetrated them are synthesized by a photosynthetic prism 27. Synthesized light is enlarged by a projection lens 28 (2) and is emitted, and is reflected by a projection mirror 29 (3) to be projected onto a screen or the like.

Figure 5:
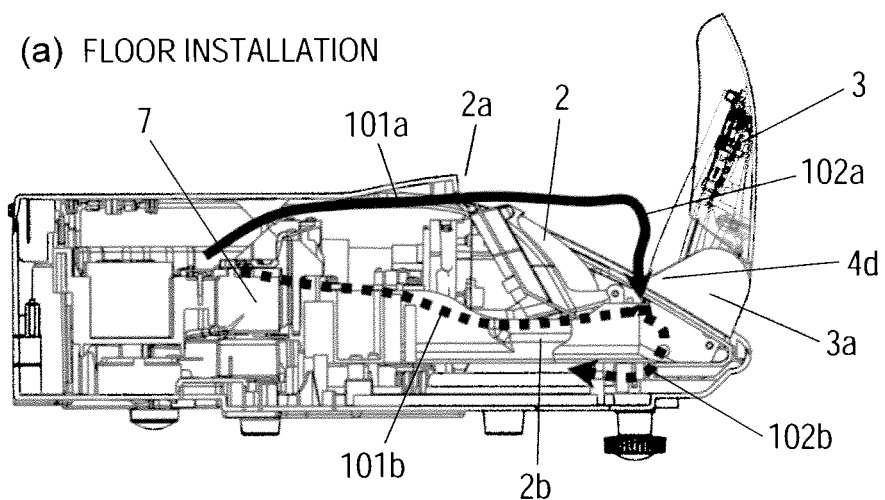
FIG. 5 is sectional diagrams showing flows of the cooling air in two installation states.
Figure 5:
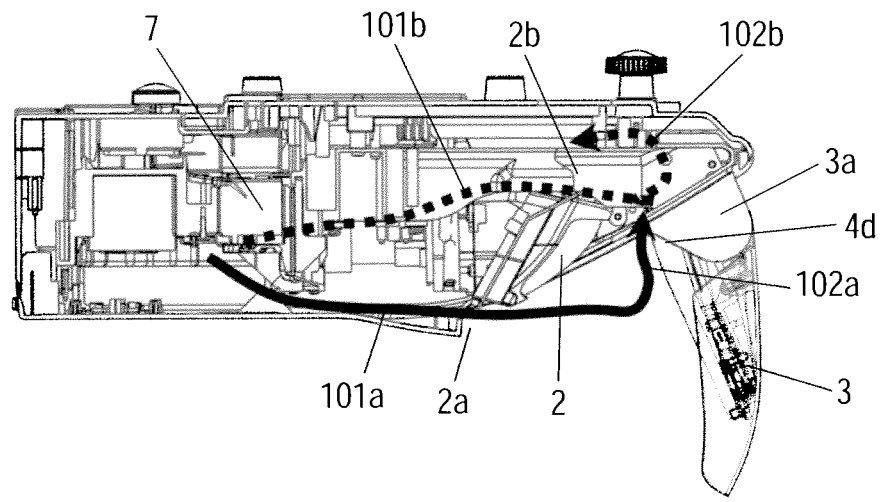

FIG. 5 is sectional diagrams showing flows of cooling air in two installation states, in which (a) is a case of floor installation and (b) is a case of suspended installation. Parts 101a and 101b of the air flow after cooling the liquid crystal panel 7 are temporarily blown off to the outside of device through the openings 2a and 2b around the projection lens 2. This is because the inside of device in the vicinity of the projection panel 2 is positively pressurized. The blown off air flows 101a and 101b are at high temperatures because they have passed through the liquid crystal panel 7 and will turn into ascending air currents in a conventional structure.

On the other hand, in the present embodiment, since the air inlet 4d is provided in the sealing mechanism 3a of the projection mirror 3 in either of the floor installation in (a) and the suspended installation in (b) of FIG. 5, the air flows 101a and 101b blown off through the openings 2a and 2b turn into air flows 102a and 102b and are sucked into the device through the air inlet 4d. This is because the air inlet 4d in the vicinity of the projection mirror 3 is negatively pressurized by an exhaust fan 15 within the device. Then, the air flows 102a and 102b cool the power source unit 8 within the device and are exhausted to the outside through the exhaust port 5.

Therefore, the air flows 101a and 101b which have been once blown off to the outside through the openings 2a and 2b are sucked into the device without staying in front of the projection mirror 3. Thereby, the reflective surface of the projection mirror 3 can be prevented from being stained with the dust.

Although the cases of the floor installation and suspended installation have been shown as the installation modes here, the same thing also applies to cases such as the upward projection installation that projection is performed toward a ceiling or the like and the downward projection installation that projection is performed toward a desk or the like.

In the following, a structure of a conventional projection image displaying device and flows of cooling air therein will be shown and described in comparison with the present embodiment.

Figure 6:
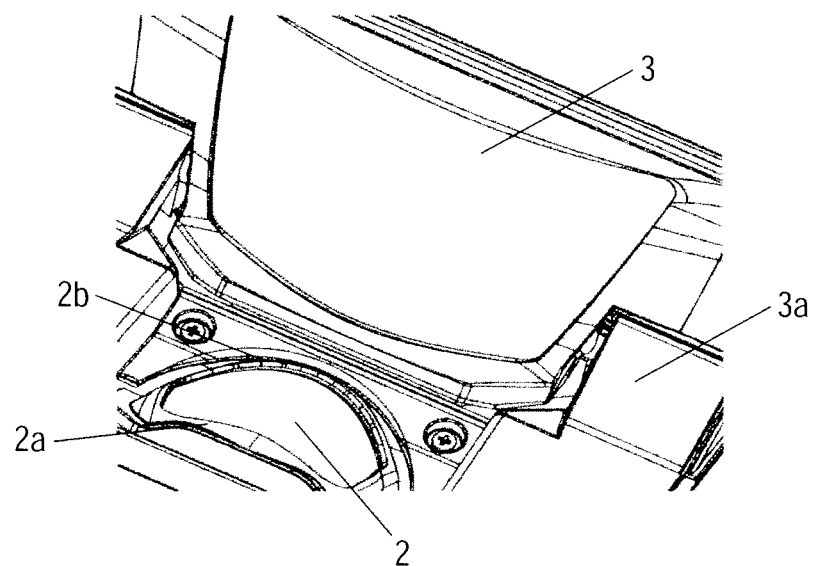
FIG. 6 is an enlarged diagram of the vicinity of a mirror of a conventional projection image displaying device.

FIG. 6 is an enlarged diagram of the vicinity of a mirror of the conventional projection image displaying device. The structure is made such that external air cannot enter the inside of device because although openings 2a and 2b are provided around a projection lens 2, an air inlet is not formed in a sealing mechanism 3a of a projection mirror 3.

Figure 7:
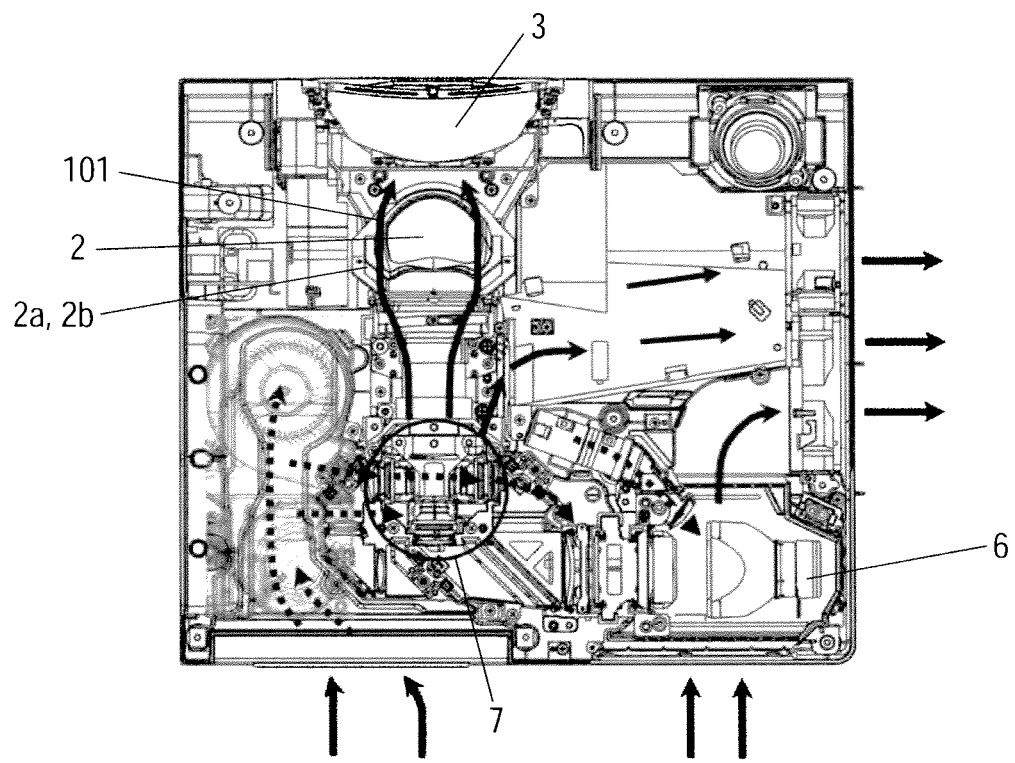
FIG. 7 is a diagram showing flows of cooling air within the conventional device.

FIG. 7 is a diagram showing flows of cooling air within the conventional device. Part 101 of the cooling air which has passed through a liquid crystal panel 7 is blown off to the outside of device through the openings 2a and 2b on the projection lens 2. This is because the inside of device in the vicinity of the projection lens 2 is positively pressurized. The air flow 101 which has been once blown off never returns into the inside of device.

Figure 8:
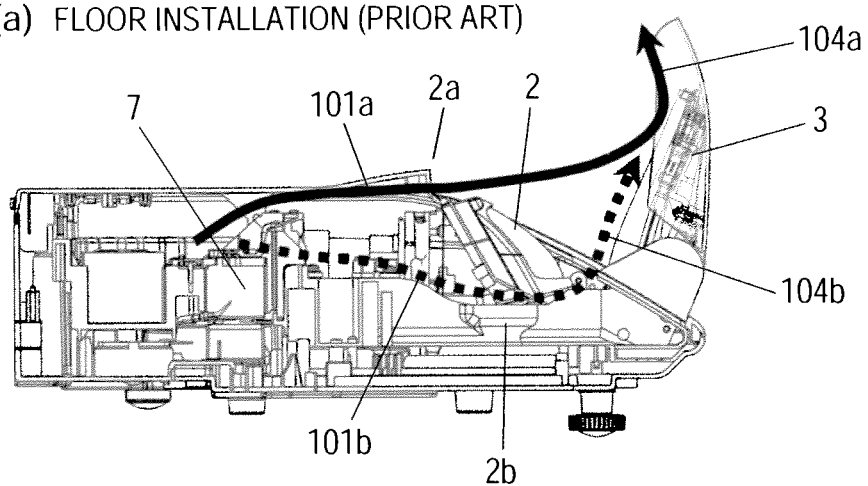
FIG. 8 is sectional diagrams showing conventional flows of the cooling air in two installation states.
Figure 8:
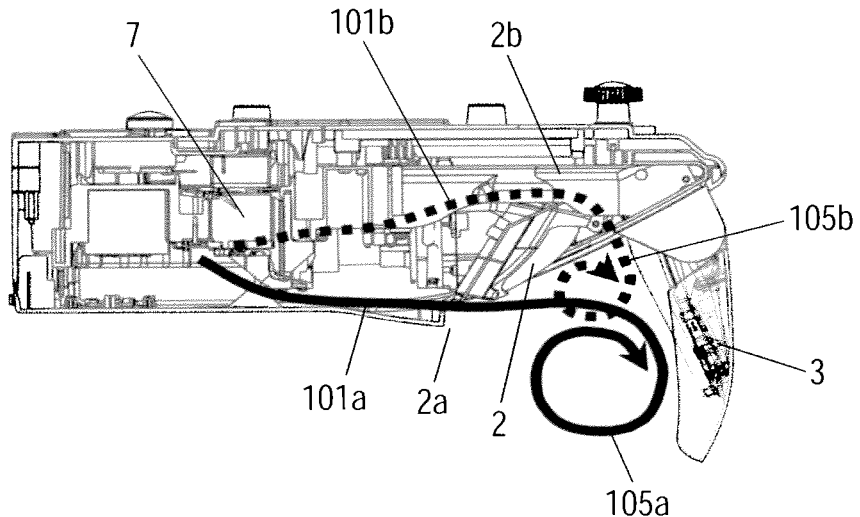

FIG. 8 is sectional diagrams showing conventional flows of cooling air in two installation states, in which (a) is a case of floor installation and (b) is a case of suspended installation. Parts 101a and 101b of the air flow after cooling the liquid crystal panel 7 are temporarily blown off to the outside of device through the openings 2a and 3b around the projection lens 2. This is because the inside of device in the vicinity of the projection lens 2 is positively pressurized.

In the case of the floor installation in FIG. 8(a), since the air flows 101a and 101b blown off through the openings 2a and 2b are at temperatures higher than the surroundings, they turn into ascending air currents 104a and 104b and are diffused along the reflective surface of the projection mirror 3. In this case, the ascending air currents 104a and 104b do not stay in front of the projection mirror 3 and the dust does not adhere to the reflective surface.

On the other hand, in the case of the suspended installation in FIG. 8(b), the air flows 101a and 102b blown off through the openings 2a and 2b cannot go upward because their upper sides are obstructed by a case 1 and the projection mirror 3, and turn into vortex flows 105a and 105b and stay in front of the projection mirror 3. In such a case, the dust will adhere to the reflective surface of the projection mirror 3 and stain it.

As installation modes other than the above, there are cases of the upward projection installation that projection is performed toward a ceiling or the like and the downward projection installation that projection is performed toward a desk or the like. In the case of the upward projection installation, an air flow blown off through an opening turns into an ascending air current and is diffused, while, in the case of the downward projection installation, since it stays because its upper side is obstructed by the projection mirror, the dust will adhere to the reflective surface.

Figure 9:
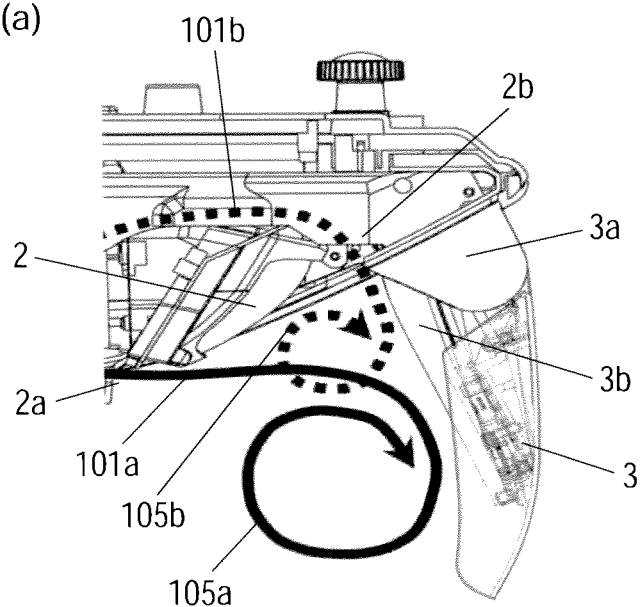
FIG. 9 is diagrams showing a mechanism of adhesion of dust to a conventional projection mirror.
Figure 9:
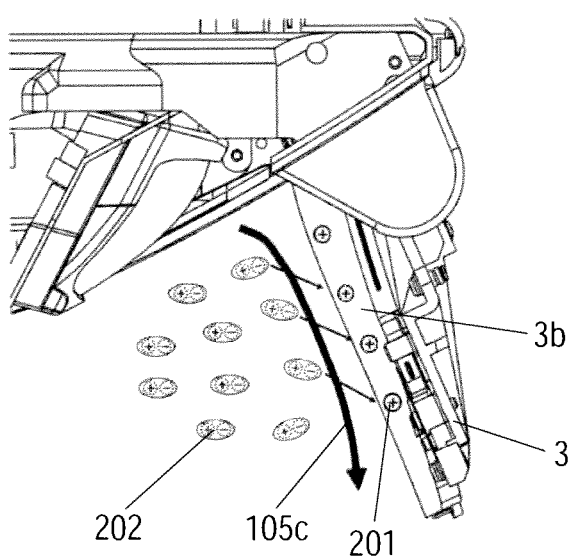

FIG. 9 is diagrams showing a mechanism of adhesion of the dust to the conventional projection mirror. FIG. 9(a) is an enlarged diagram of the cooling air in the vicinity of the projection mirror in the above-mentioned FIG. 8(b) (the suspended installation). Although the air flows 101a and 101b temporarily go down along the reflective surface 3b of the projection mirror 3 after having been blown off through the openings 2a and 3b, they go up because their temperatures are higher than the surroundings, and turn into the vortex flows 105a and 105b and stay in front of the projection mirror 3.

FIG. 9(b) is a diagram explaining the mechanism of dust adhesion. The vortex flows 105a and 105b which stay in front of the projection mirror 3 turn into a frictional flow 105c which is in contact with the reflective surface 3b, while engulfing dust 202 contained in the external air by mixing with the external air which is present in a front space of the projection mirror 3. As a result, static electricity 201 generates on the reflective surface 3b and the dust 202 engulfed in the vortex flow is sucked and adheres to the reflective surface 3b. The adhesion amount of the dust depends on the flow velocity of the frictional flow 105c. Incidentally, in the case of such floor installation as shown in FIG. 8(a), since the blown air flows 104a and 104b do not turn into vortex flows, but turn into laminar flows which are comparatively high in flow velocity, they rarely engulf the dust 202 contained in the external air and the amount of adhesion to the reflective surface 3b is small.

Figure 10:
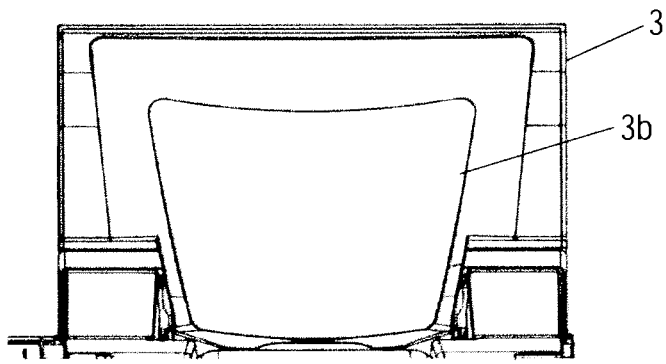
FIG. 10 is diagrams schematically showing dirt on the projection mirror by dust adhesion.
Figure 10:
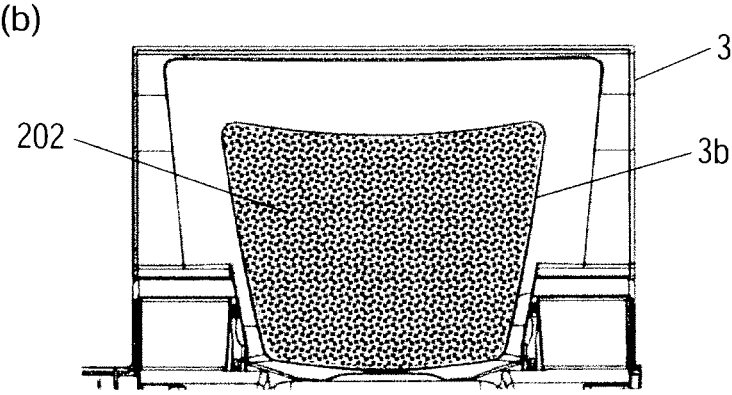
Figure 10:
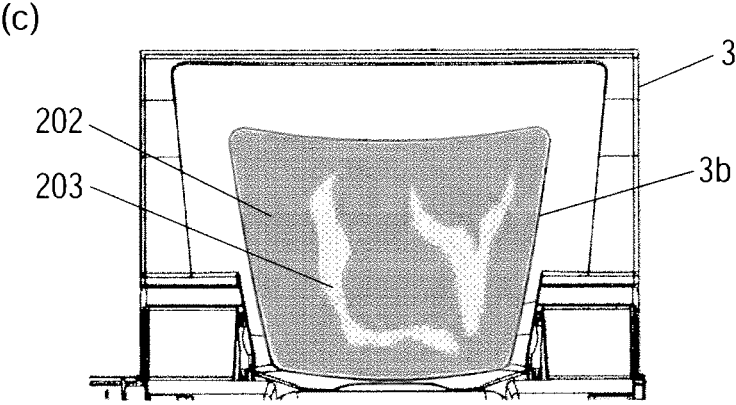

FIG. 10 is diagrams schematically showing dirt on the projection mirror caused by dust adhesion. FIG. 10(a) is a normal case, showing a state where no dust adheres to the reflective surface 3b of the projection mirror 3. FIGS. 10(b) and 10(c) are cases that the conventional projection image displaying device has been used in the suspended state (FIG. 8(b)), showing states where the dust 202 has adhered to the reflective surface 3b of the projection mirror 3.

FIG. 10(b) shows the case that the dust 202 has adhered to the entire surface of the reflective surface 3b of the projection mirror 3. When the dust adheres to the reflective surface 3b, its reflectance is reduced and the luminance of an image projected onto the screen gets dark. In addition, FIG. 10(c) shows the case that the dust 202 has unevenly adhered to the reflective surface 3b of the projection mirror 3. Also in this case, adhesion unevenness 203 of the dust 202 leads to unevenness in reflectance and will be projected as luminance unevenness of the projected image. Such adhesion of the dust 202 to the reflective surface 3b as mentioned above will impair the quality of the projected image.

According to the projection image displaying device of the embodiment 1, adhesion of the dust to the reflective surface of the projection mirror is prevented in all the installation states including the suspended state, the clean reflective surface can be maintained as in FIG. 10(a) and the projected image of high quality can be stably displayed.

Embodiment 2

In the embodiment 1, the structure that adhesion of the dust and the like to the projection mirror is prevented while using the projection image displaying device in a state where the projection mirror is unsealed has been described. On the other hand, in the embodiment 2, a structure that adhesion of the dust and the like to the projection mirror is greatly reduced while using the projection image displaying device in a state where the projection mirror is sealed will be described.

Figure 11:
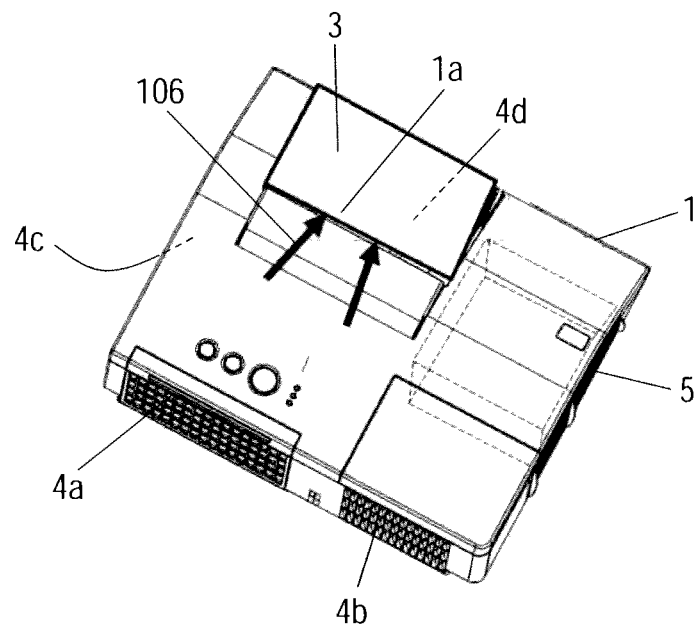
FIG. 11 is an outline view showing a state of sealing the projection mirror of the projection image displaying device.

FIG. 11 is an outline view showing a state where the projection mirror of the projection image displaying device used in the embodiment 1 is sealed. In the mirror sealing type projection image displaying device, when the power source is turned off, lighting of the light source is turned off to perform an operation of sealing the projection mirror 3. However, a cooling operation is performed for a predetermined time in order to cool heat generated components within the device. In this cooling operation, the cooling fan is continuously operated to take in the external air through the respective air inlets 4a to 4d and to exhaust the air through the exhaust port 5. At this time, if the air inlet 4d which is provided in the vicinity of the projection mirror also performs the sucking operation, the external air 106 will be sucked through a gap 1a between the sealed projection mirror 3 and the case 1. Since the dust and the like are contained in the sucked external air 106, they adhere to the reflective surface of the projection mirror 3 and dirt is generated.

Figure 12:
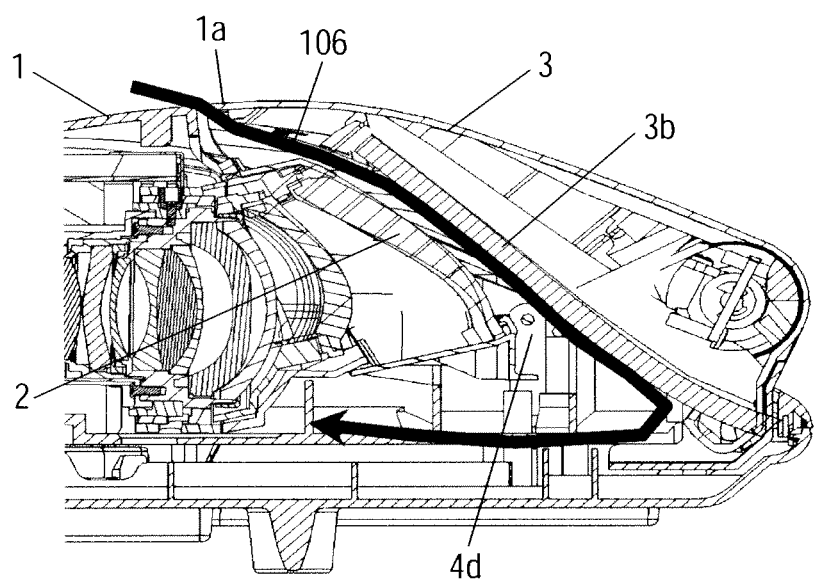
FIG. 12 is a sectional diagram showing a flow of air in the vicinity of the projection mirror during a cooling operation.

FIG. 12 is a sectional diagram showing a flow of air in the vicinity of the projection mirror during the cooling operation. When the respective cooling fans are operated during cooling, the air inlet 4d is put into a negative pressure state, thereby the sucked external air 106 is taken into the device passing through a gap between the projection lens 2 and the projection mirror 3. Since this gap is narrow in width, the dust and the like (rubbish) contained in the external air 106 are liable to adhere to the reflective surface of the projection mirror 3. As a result, when the image is to be displayed by unsealing again the projection mirror 3, the image quality will be deteriorated. This phenomenon occurs regardless of the installation state of the displaying device, and, for example, even in the floor installation, it brings problems.

Therefore, the present embodiment is made so as to stop or greatly reduce the operation of sucking air through the air inlet 4d by controlling the operations of the cooling fans in order to prevent the dust and the like from adhering to the reflective surface of the projection mirror during the cooling operation.

Figure 13:
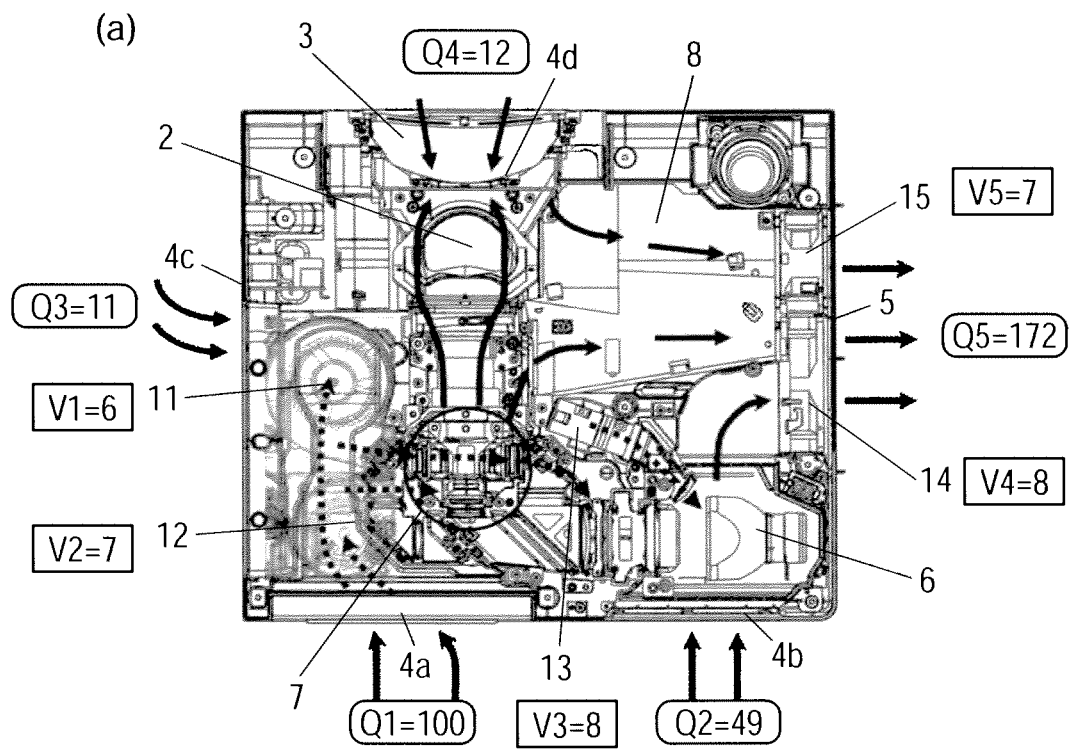
FIG. 13 is diagrams showing relations between operations of respective cooling fans within the device and suction and exhaust air quantities.
Figure 13:
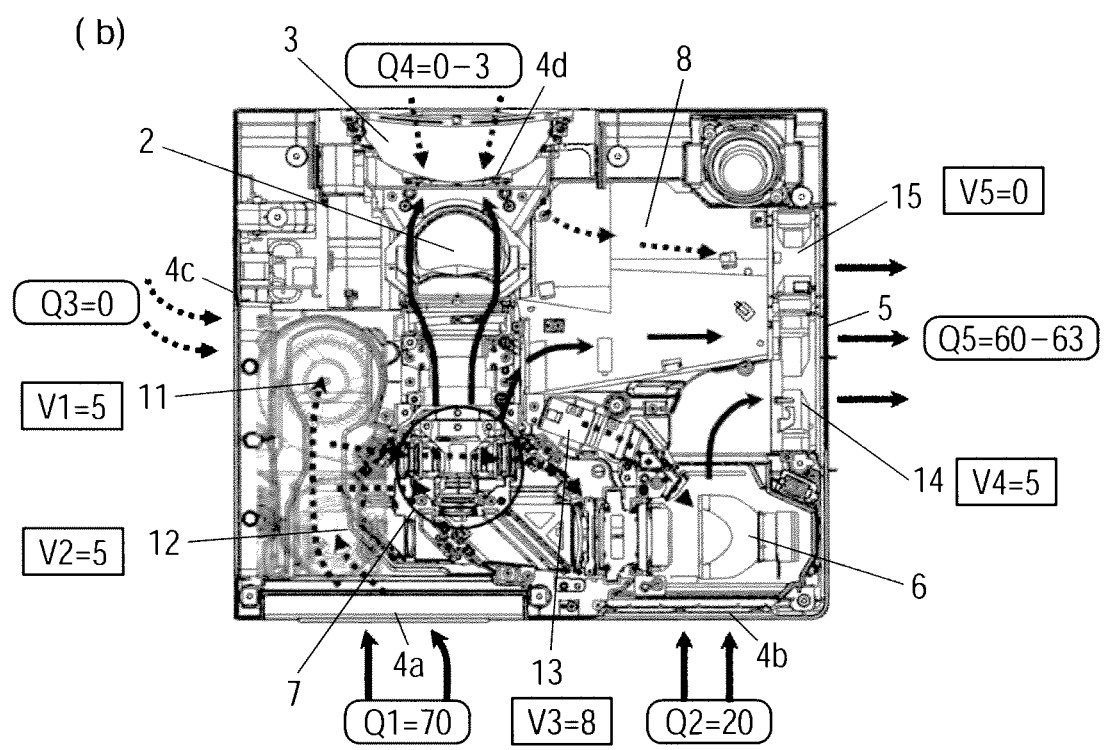

FIG. 13 is diagrams showing relations between the operations of the respective cooling fans within the device and suction and exhaust air quantities. FIG. 13(a) corresponds to the case (the embodiment 1) that they are used with the projection mirror unsealed and all the cooling fans within the device are driven. FIG. 13(b) corresponds to the case that they are used with the projection mirror sealed (the cooling operation in the embodiment 2) and the cooling fans are selectively driven. With respect to each case, examples measured values (all of them are relative values) of a drive voltage V of each of the fans 11 to 15 and an air quantity Q in each of the air inlets and exhaust port 4a to 4d, and 5 are described.

In FIG. 13(a), all the fans 11 to 15 are driven at drive voltages V1 to V5. The suction air quantities through the respective air inlets 4a, 4b and 4c at that time are respectively Q1=100, Q2=49 and Q3=11, and the suction air quantity of just Q4=12 is present also through the air inlet 4d. This is because since it is insufficient with Q1+Q2+Q3=160 which is the sum of the suction air quantities through the air inlets 4a to 4c for the exhaust air quantity Q5=172 through the exhaust port 5, Q4=12 is supplied through the air inlet 4c1 as the shortage. That is, the air inlet 4d is put into a negative pressure state by the amount of the suction air quantity Q4 by excessively setting the suction air quantity Q5 through the exhaust port 5.

On the other hand, in FIG. 13(b), driving of the fan 15 which is near the power source unit 8 is stopped (V5=0) and the voltages V1 to V4 of the other fans 11 to 14 are also reduced. The suction air quantities through the respective air inlets 4a, 4b and 4c at that time are respectively Q1=70, Q2=20 and Q3=0, and the suction air quantity through the air inlet 4d is Q4=about 0 to 3. This is because since the sum Q1+Q2+Q3=90 of the suction air quantities through the air inlet 4a to 4b exceeds the exhaust air quantity Q5=60 to 63 through the exhaust port 5, it is not necessary to suck the shortage through the air inlet 4d. That is, the air inlet 4d is switched from the negative pressure state to a state near the outside pressure by stopping the fan 15 so as to reduce the exhaust air quantity Q5 through the exhaust port 5. In this case, although cooling of the power source unit 8 is weakened by stopping the fan 15, since the main object of the cooling operation is to cool the light source 6, it never occurs that the cooling function is spoiled. Thereby, it becomes possible to prevent or greatly reduce intrusion of the external air through the air inlet 4d. The drive voltages and air quantity distributions of the fans shown here are merely examples and they may be appropriately set in accordance with arrangement of components within the device.

As described, in the embodiment 2, intrusion of the external air through the periphery of the sealed projection mirror is eliminated by controlling the air quantities of the cooling fans in the cooling operation and staining caused by adhesion of the dust and the like to the reflective surface of the projection mirror can be greatly reduced.

DESCRIPTION OF REFERENCE NUMERALS OR SYMBOLS

1 . . . case, 2 . . . projection lens, 2a, 2b . . . opening, 3 . . . projection mirror, 3a . . . sealing mechanism, 3b . . . reflective surface, 4a-4d . . . air inlet, 5 . . . exhaust port, 6 . . . light source, 7 . . . liquid crystal panel, 8 . . . power source unit, 9 . . . panel drive circuit, 10 . . . CPU (control unit), 11-15 . . . cooling fan, 101-106 . . . air flow, 201 . . . static electricity

The invention claimed is:

1. In a projection image displaying device having a sealable projection mirror on an upper surface of a case and enlarging and projecting imaging light emitted from a projection lens onto a projecting plane by being reflected by said projection mirror, the projection image displaying device, characterized in that it comprises:

a plurality of cooling fans taking in and exhausting external air in order to cool components contained within the case, and an air inlet on the projection mirror for sucking the external air into the case is disposed at the near position of a sealing mechanism for operating said projection mirror to be sealed/unsealed, wherein an opening is provided around said projection lens for movement adjustment of said projection lens, and said air inlet provided on the projection mirror sucks air blown off through said opening provided on said projection lens into the case.

2. The projection image displaying device according to claim 1, wherein said opening provided on said projection lens is put into a positive pressure state which is higher in air pressure than the external air by an action of sending air from said cooling fans, and said air inlet provided on said projection mirror is put into a negative pressure state which is lower in air pressure than the external air by an exhausting action of said cooling fans.

3. In a projection image displaying device having a sealable projection mirror on an upper surface of a case and enlarging and projecting imaging light emitted from a projection lens onto a projecting plane by being reflected by said projection mirror, the projection image displaying device, characterized in that it comprises:

a plurality of cooling fans taking in and exhausting external air in order to cool components contained within the case, and an air inlet on the projection mirror for sucking the external air into the case is disposed at the near position of a sealing mechanism for operating said projection mirror to be sealed/unsealed, wherein when a cooling operation of cooling the components within the case is to be performed by sealing the projection mirror, a sucking operation through the air inlet provided on said projection mirror is stopped or reduced.

4. The projection image displaying device according to claim 3, wherein said air inlet provided on said projection mirror is switched from a negative pressure state to a nearly outside pressure state by stopping the exhausting operation of part of said cooling fans during said cooling operation.

* * * * *